United States Patent [19]
Morris

[11] Patent Number: 6,012,648
[45] Date of Patent: Jan. 11, 2000

[54] APPARATUS AND METHOD FOR LOCKING A SPRAY BOOM

[76] Inventor: Phillip E. Morris, 1301 Jane La., Greenwood, Miss. 38930

[21] Appl. No.: 09/071,777

[22] Filed: May 4, 1998

[51] Int. Cl.[7] .................................................. B05B 1/20
[52] U.S. Cl. ........................... 239/167; 172/456; 172/662; 172/683; 248/235
[58] Field of Search ........................... 239/159, 166–168; 248/654, 658, 235, 241, 285.1; 172/269, 481, 662, 683, 460, 459, 456

[56] References Cited

U.S. PATENT DOCUMENTS

| | | | |
|---|---|---|---|
| 3,807,676 | 4/1974 | Bieker et al. | 239/167 |
| 4,021,011 | 5/1977 | Kalsson et al. | 248/235 |
| 4,074,766 | 2/1978 | Orthman | 172/311 |
| 4,219,947 | 9/1980 | Paladino | 172/683 |
| 4,379,522 | 4/1983 | Elliott et al. | 239/167 |
| 4,595,140 | 6/1986 | Harden et al. | 239/167 |
| 4,643,358 | 2/1987 | Jackson | 239/166 |
| 4,660,654 | 4/1987 | Wiebe et al. | 172/456 |
| 4,727,691 | 3/1988 | Kubacak | 52/114 |
| 4,880,160 | 11/1989 | Paterson et al. | 239/167 |
| 4,944,355 | 7/1990 | Karchewski | 172/278 |
| 5,029,757 | 7/1991 | Bourgault et al. | 239/167 |
| 5,154,240 | 10/1992 | Carrick | 172/311 |
| 5,165,486 | 11/1992 | Davidson | 172/662 |
| 5,178,328 | 1/1993 | Broyhill | 239/168 |
| 5,507,435 | 4/1996 | Benest | 239/1 |
| 5,540,290 | 7/1996 | Peterson et al. | 172/456 |
| 5,577,563 | 11/1996 | Holen | 172/456 |
| 5,630,547 | 5/1997 | Klemenhagen et al. | 239/161 |

FOREIGN PATENT DOCUMENTS

| | | | |
|---|---|---|---|
| 2088181 | 6/1982 | United Kingdom | 239/159 |

*Primary Examiner*—Andres Kashnikow
*Assistant Examiner*—Dinh Q. Nguyen
*Attorney, Agent, or Firm*—Kenyon & Kenyon

[57] ABSTRACT

A boom lock assembly is disclosed. The boom lock assembly locks a boom in a boom saddle and includes a lock mounting frame, a boom lock, and a boom lock actuator. The lock mounting frame is attached to the boom saddle frame. The lock mounting frame includes an actuator support member and a lock support member. The boom lock is slidably mounted on the lock support member and is moveable between a first extended position and a second retracted position. When the boom lock is in the first extended position, the boom lock captures the boom between the boom saddle and the boom lock. When the boom lock is in the second position, the boom lock permits movement of the boom out of the saddle. The boom lock actuator is mounted to the actuator support member at a first end and the boom lock at a second end. The boom lock actuator moves the boom lock to its first and second positions.

37 Claims, 5 Drawing Sheets

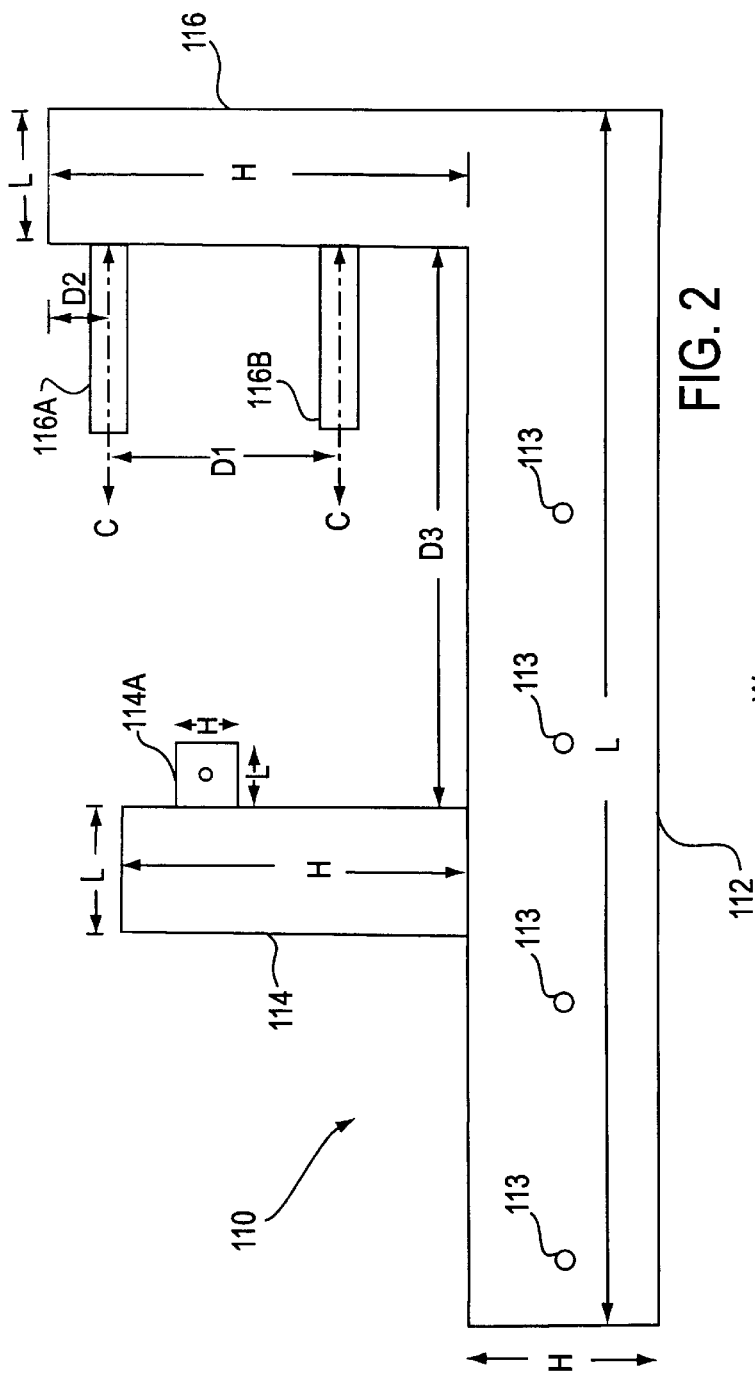
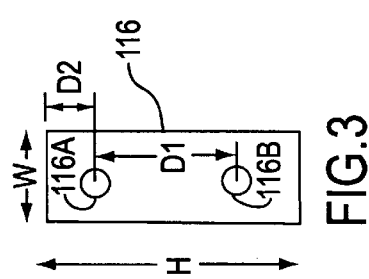

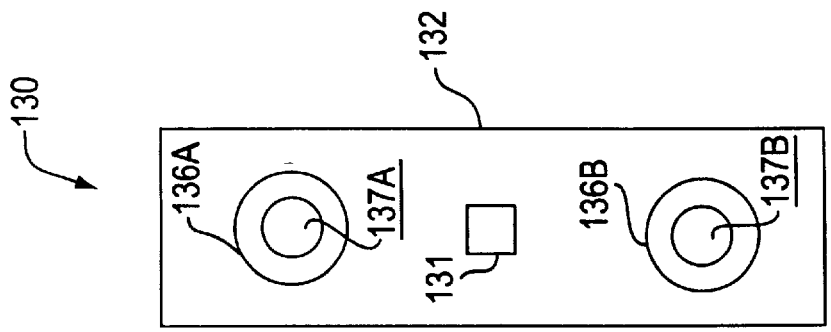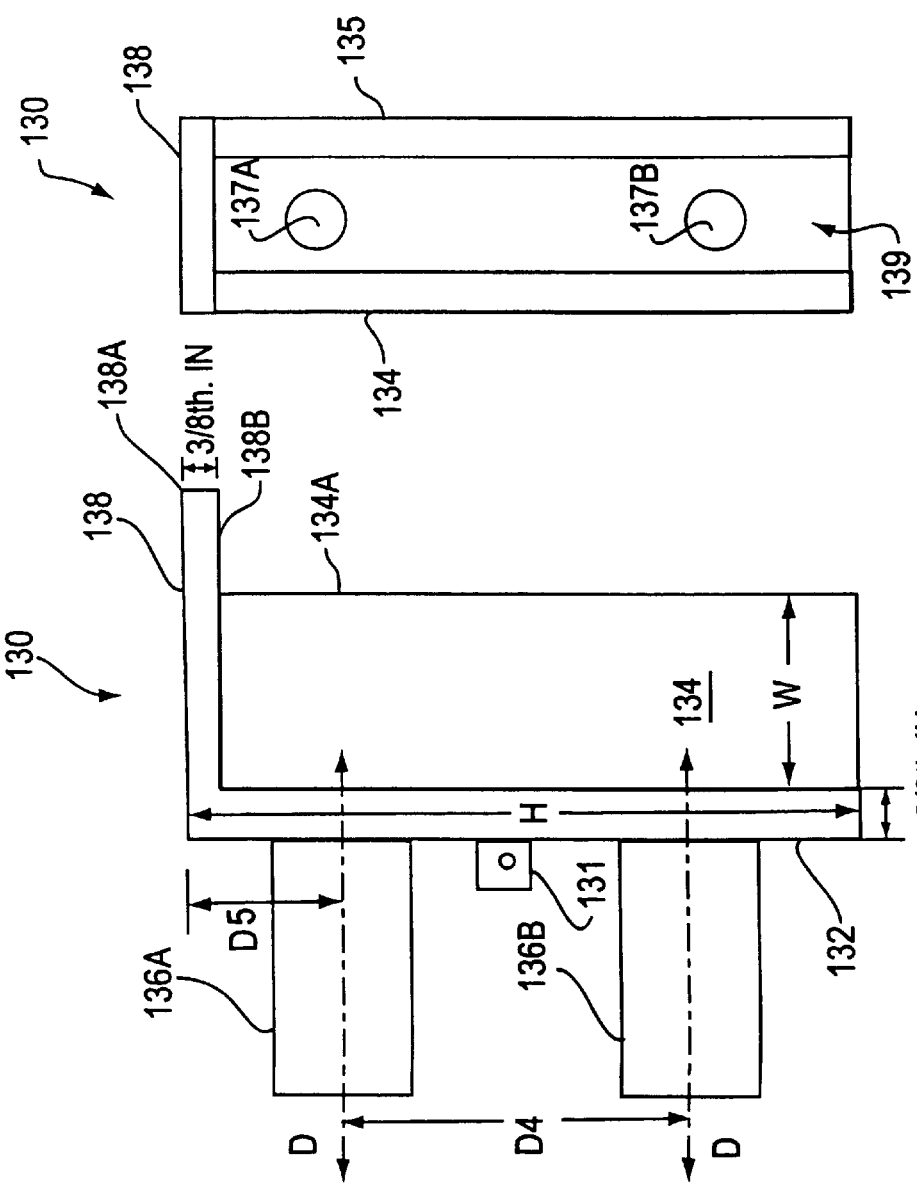

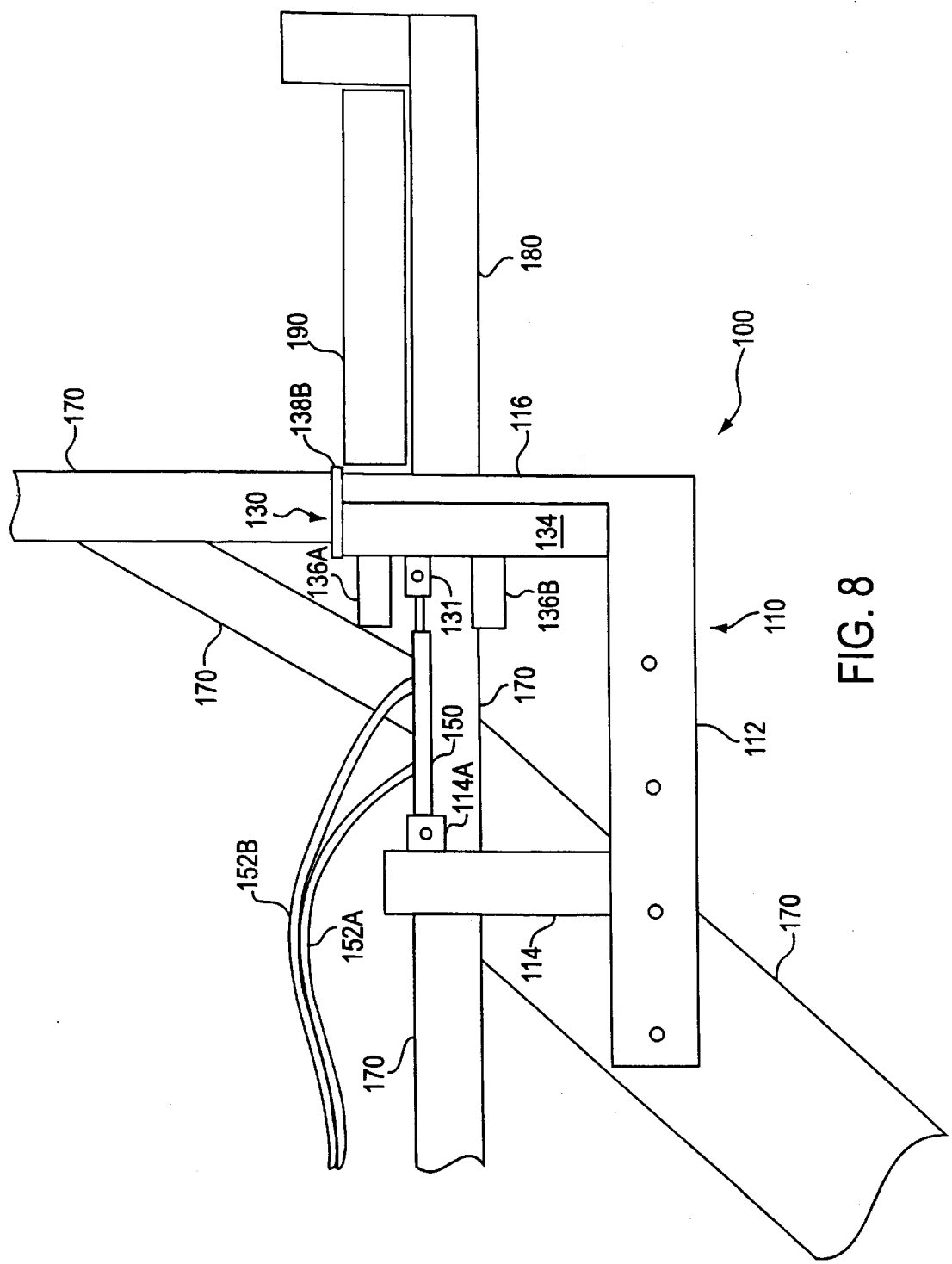

APPARATUS AND METHOD FOR LOCKING A SPRAY BOOM

BACKGROUND OF THE INVENTION

The present invention relates to a spray boom lock. More specifically, the invention provides for locking a spray boom in a boom saddle while transporting the boom in its folded configuration.

Spray booms are used to apply materials evenly across a field. The booms are generally very wide, some extending up to 90 feet, in order to spray as much of the field as possible with each pass of the spraying vehicle. The weight of the boom generally correlates to its width. The wider the boom, the heavier it is, which presents problems when transporting the booms from one field to another.

When the spraying vehicle is transported from one field to another, the booms are folded up and supported by boom saddles so that the vehicle is able to travel on public and private roads. However, there are problems when transporting the folded booms. As the vehicle travels over the road with the booms folded in the saddles, the booms tend to bounce due to the motion of the vehicle over the road. The booms can bounce out of the saddles, thus possibly causing damage to the booms and to other vehicles nearby. Even if the booms are not displaced from the saddles, their bouncing can cause damage to the booms, the saddles, and other supporting structures on the carrying vehicle.

Currently, boom locking devices are known, however, their use presents problems. Generally, known locking devices utilize systems of cables, pulleys, and hooks which are a burden for the operator to manually operate. Therefore, it would be desirable to provide an easily operated and installed boom lock for securely transporting a folded spray boom. The boom lock could be utilized with a wide variety of different carrying vehicles.

SUMMARY OF THE INVENTION

The drawbacks in the prior art are overcome by the present invention for a boom lock assembly. The boom lock assembly locks the boom in the boom saddle. In one embodiment of the present invention, the boom lock assembly includes a lock mounting frame, a boom lock, and a boom lock actuating means. The lock mounting frame is attached to the boom saddle frame. The lock mounting frame includes an actuator support member and a lock support member. The boom lock is slidably mounted on the lock support member and is moveable between a first extended position and a second retracted position. When the boom lock is in the first extended position, the boom lock captures the boom between the boom saddle and the boom lock. When the boom lock is in the second retracted position, the boom lock permits movement of the boom out of the saddle. The boom lock actuating means is mounted to the actuator support member at a first end and the boom lock at a second end. The boom lock actuating means moves the boom lock to its first and second positions.

In this manner, the present invention provides for an easily installed and operated boom lock. The boom lock locks the boom in the boom saddle for transportation of the boom from one field to another.

BRIEF DESCRIPTION OF THE DRAWINGS

FIG. 2 is a side view of an embodiment of the lock mounting frame of the present invention.

FIG. 3 is a rear view of the lock support member of the lock mounting frame as illustrated in FIG. 2.

FIG. 4 is a side view of an embodiment of the boom lock of the present invention.

FIG. 5 is a front view of the boom lock of FIG. 4.

FIG. 6 is a rear view of the boom lock of FIG. 4.

FIG. 8 is a side view of the boom lock assembly of FIG. 1 where the lock has been retracted from its position of extending over the saddle cradle.

DETAILED DESCRIPTION

Figure 1:
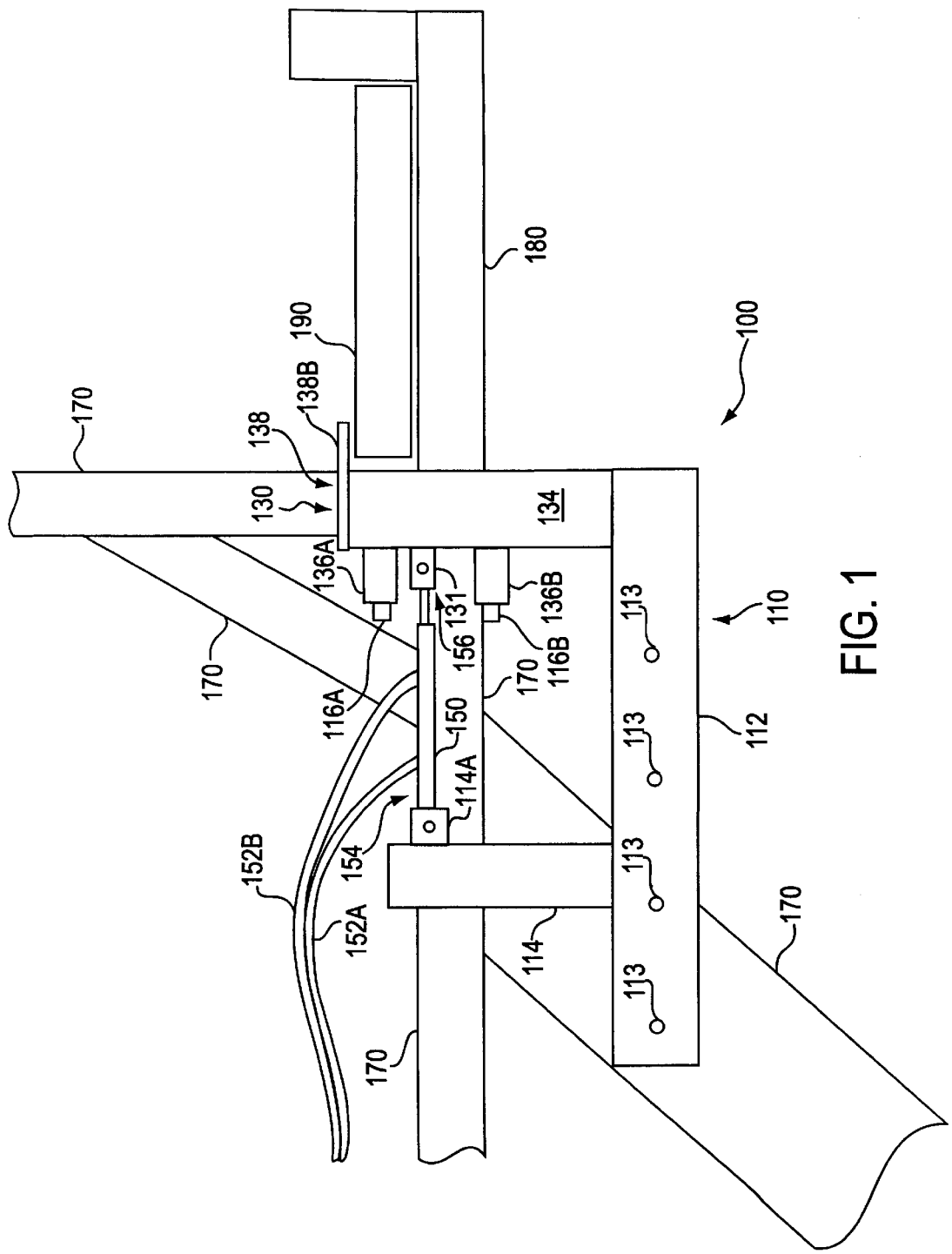
FIG. 1 is a side view of an embodiment for the boom lock assembly of the present invention as mounted on a boom saddle frame where the lock has been extended to lock the boom in the saddle cradle.

FIG. 1 illustrates one embodiment for the boom lock assembly 100 of the present invention. As shown in FIG. 1, a boom 190 has been placed in a boom saddle cradle 180 for transportation to another field by a boom carrying vehicle. Boom saddle cradle 180 is formed integral with boom saddle frame 170, which extends from the boom carrying vehicle (not shown in FIG. 1). The boom lock assembly 100 is mounted on the carrying vehicle's boom saddle frame 170.

As illustrated in FIG. 1, boom lock assembly 100 includes lock mounting frame 110, boom lock 130, and boom lock actuating means 150. As will be further described later in this specification, boom lock 130 is slidably mounted on lock mounting frame 110 for movement between a first extended position where locking plate 138 of boom lock 130 extends over a portion of boom 190 and cradle 180 and a second retracted position where locking plate 138 does not extend over boom 190 and cradle 180. When boom lock 130 is moved to its first extended position, boom 190 is securely positioned between locking plate 138 and boom saddle cradle 180, thus locking boom 190 within cradle 180 to prevent vertical motion of boom 190.

As mentioned previously, boom lock 130 is slidably mounted on lock mounting frame 110. Boom lock actuating means 150 provides the capability to move boom lock 130 between its first extended position and its second retracted position on mounting frame 110. Boom lock actuating means 150 is attached to the actuator support member 114 of lock mounting frame 110 at a first end 154 and to the boom lock's 130 mounting plate 131 at a second end 156.

In the embodiment of FIG. 1, actuating means 150 is disclosed as a pneumatically operated cylinder. Pressurized air for actuating the cylinder is supplied from the pressurized air system that is available on the boom carrying vehicle. Since virtually all boom vehicles have a pressurized air system installed, all that is required is that the air supply required to operate actuating means 150 be tapped from the vehicle's pressurized air system. As illustrated in FIG. 1, air supply lines 152A, 152B supply pressurized air to cylinder 150 to extend and retract cylinder 150, which in turn extends and retracts boom lock 130. Controls for operating the boom lock actuating means can be located in the cab of the carrying vehicle. As such, the operator is able to remotely operate the boom lock from the cab of the vehicle. Remote operation of the lock provides particular utility for the operator by saving time and effort for the operator. By remotely operating the lock, the operator is not required to exit the cab and is not required to manually engage and disengage a complex system of cables, pulleys, and hooks, as used in currently known systems.

Whereas boom lock actuating means 150 is disclosed as being a pneumatically operated cylinder, this is not the only possible method of operation. For example, the cylinder can be operated by utilizing hydraulic pressure supplied from the vehicle's installed hydraulic system. Supply lines 152A, 152B would tap into the vehicle's hydraulic system and the controls for the system would still be remotely located in the vehicle's cab. Alternatively, it is also possible that the boom lock actuating means could be electrically operated by utilizing the vehicle's electrical system.

It was discussed that the vehicle's installed pneumatic, hydraulic, or electrical system could be utilized to supply the power required to operate the lock actuating means 150, however, the present invention can be practiced even if the vehicle does not have an already installed system as discussed above. If the vehicle does not have an installed system, a system could be provided on the vehicle to supply the power required, whether it be pneumatic, hydraulic, or electrical. However, as mentioned previously, since virtually all of these types of vehicles contain the types of power systems mentioned above, it is not likely that a separate power system would have to be installed to operate the actuating means.

In further describing the boom lock assembly of the present invention, FIG. 2 illustrates the lock mounting frame 110. As can be seen, lock mounting frame 110 includes a base member 112, an actuator support member 114, and a lock support member 116. Base member 112 is a metal plate that includes actuator support member 114 at a first end thereof and lock support member 116 at a second end thereof. Actuator support member 114 and lock support member 116 both extend perpendicular from base member 112 and can be either integrally formed with base member 112 or welded to base member 112. Base member 112 contains bolt holes 113 that are used for mounting base member 112 to boom saddle frame 170. Base member 112 has a length L of approximately 19 inches, a height H of 3 inches, and a width W of 2 inches.

When mounting base member 112 to the boom saddle frame, the base member can be directly bolted to the frame, or additional mounting plates and spacers can be utilized. The additional mounting plates and/or spacers can be of any shape or size. Whether or not this additional hardware is required, and the shape/size of this hardware, is dependent upon the particular configuration of the frame to which the boom lock assembly will be mounted.

As mentioned previously, actuator support member 114 and lock support member 116 extend perpendicular from base member 112. Actuator support member 114 is utilized to attach boom lock actuating means 150 to lock mounting frame 110 at its first end 154. Actuating means 150 is mounted to support plate 114A of actuator support member 114. Actuator support member 114 has a height H of 5.5 inches, and a length L and width W of 2 inches. Support plate 114A is a 1 inch high by 1 inch long metal plate.

Lock support member 116 of lock mounting frame 110 is illustrated in FIGS. 2 and 3 and is utilized to support boom lock 130 for sliding movement of the boom lock on lock support member 116. As such, lock support member 116 includes first and second lock guide pins, 116A and 116B, respectively. Lock guide pins 116A and 116B are ⅝th inch diameter cylindrical metal rods that extend perpendicular from support member 116 for a length of approximately 3 inches. The guide pins extend parallel to, and toward the first end of, base member 112. Guide pins 116A, 116B are formed integral with support member 116.

Lock support member 116 has a height H of 6.5 inches, a length L of 2 inches, and a width W of 2 inches. The longitudinal centerlines C of lock guides pins 116A, 116B are separated by a distance $D_1$ of 3.5 inches and centerline C of guide pin 116A is located of distance $D_2$ of 1 inch from the top of support member 116. Actuator support member 114 is located a distance $D_3$ of 9 inches from lock support member 116.

FIGS. 4–6 illustrate the boom lock 130 of the present invention. As can be seen, in FIG. 4, boom lock 130 includes a base plate 132, first and second side plates 134, 135, respectively, and a locking plate 138. First and second side plates 134, 135, top plate 138, and base plate 132 can be either a single, integrally formed structure or can be comprised of separate structures that are welded together. Base plate 132 has a height H of approximately 7 and ⅜ inches and a thickness of ⅜th of an inch. Side plates 134, 135 extend a distance W of approximately 2 inches from base plate 132. Locking plate 138 extends perpendicularly from the top of base plate 132. The distal end 138A of top plate 138 extends a distance of approximately 1 inch beyond the distal ends 134A and 135A (not shown) of side plates 134, 135, respectively, to define a locking portion 138B. Base plate 132, side plates 134, 135, and locking plate 138 form an internal cavity 139.

Also included on boom lock 130 are first and second lock guides, 136A, 136B, respectively. The first and second lock guides are cylinders with a central bore that extend perpendicularly from base plate 132, in a direction opposite that of locking plate 138, and are approximately 2.5 inches long. Each lock guide has an outside diameter of approximately 1.25 inches and an inside diameter just slightly larger than ⅝th of an inch. Thus, lock guides 136A and 136B define bores 137A and 137B, respectively. Bores are also provided in base plate 132 to align with the bores defined by lock guides 136A and 136B. The bore centerlines D of lock guides 136A and 136B are separated from each other by a distance $D_4$ of approximately 3 and ⅝th inches and centerline D of lock guide 136A is located a distance $D_5$ of approximately 1 and ⅝th inches from the top of lock plate 138.

Figure 7:
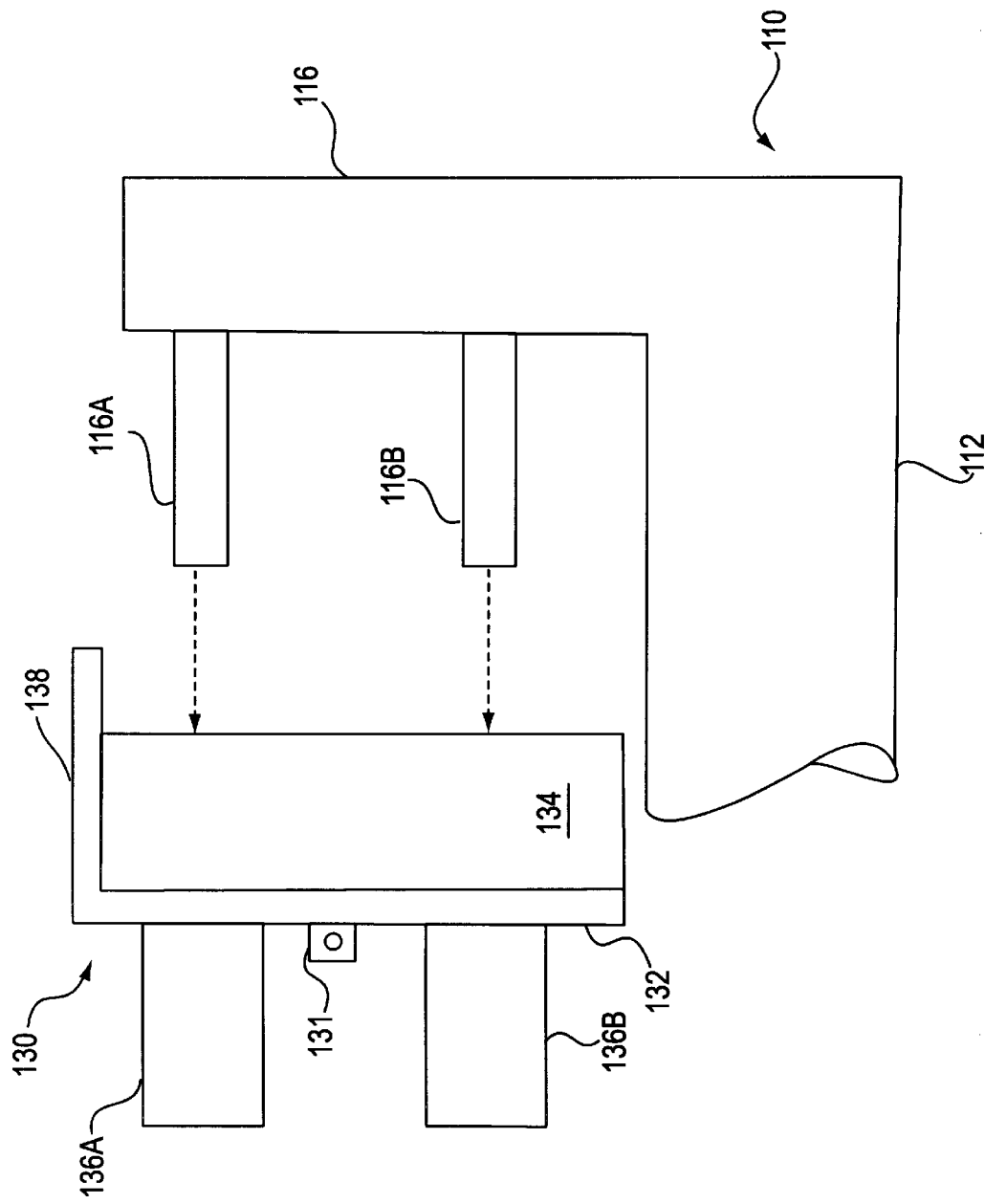
FIG. 7 is a side view of the boom lock as it is positioned for mounting on the lock mounting frame.

As stated previously, boom lock 130 is slidably mounted on lock mounting frame 110 through lock guide pins 116A, 116B and lock guides 136A, 136B. FIG. 7 illustrates boom lock 130 as it is positioned for mounting on lock mounting frame 110. As can be seen, lock guide pins 116A and 116B are inserted into lock guides 136A and 136B, respectively. When the pins are inserted into the guides, lock support member 116 is received within internal cavity 139 of boom lock 130, which is defined by base plate 132, side plates 134, 135, and locking plate 138. Thus, boom lock 130 is slidably mounted on lock mounting frame 110. Boom lock 130 is moved between its first extended position and second retracted position by boom lock actuating means 150, as described previously.

In utilizing an embodiment of the present invention when transporting a boom from one field to another, the boom 190 is folded and placed into the boom saddle cradle 180. The operator of the boom lock assembly 100 will operate a pneumatic cylinder 150 to control the positioning of the boom lock 130 with respect to the boom 190. To lock the boom in the cradle, the operator will supply pneumatic pressure to cylinder 150 so that cylinder 150 moves boom lock 130 to its first extended position, as shown in FIG. 1. As illustrated, when boom lock 130 is in this position, locking portion 138B extends over a portion of boom 190 and saddle cradle 180 to lock the boom in the cradle. Locking portion 138B extends a distance of approximately 1 inch over boom 190. There is a vertical spacing of approximately 0.25 inches between locking plate 138 and boom 190. This spacing between the locking plate and the boom provides for secure positioning of the boom between the locking plate and the cradle to prevent substantial vertical movement of the boom, but yet, does not restrain the boom so rigidly that damage could be caused to either the boom lock, the boom, or the saddle when forces are applied to the boom during transport.

To retract boom lock 130 from its locking position over boom 190, the operator pneumatically controls cylinder 150 to slide boom lock 130 away from boom 190 and cradle 180 in a direction toward actuator support member 114. The stroke of cylinder 150 is such that boom lock 130 is moved a distance that is sufficient to retract locking portion 138B from extending over the boom and cradle, but yet, does not disengage the guide lock pins 116A, 116B from the lock guides 136A, 136B, respectively. FIG. 8 illustrates the boom lock 130 when it is in its second retracted position.

It should be understood that the present invention is not limited to an embodiment that is designed to the dimensions that are provided in this specification. The present invention may be practiced by sizing the components to a variety of dimensions and the present invention is not limited to those provided.

Both the locking mounting frame 110 and the boom lock 130 can be manufactured from any of a variety of materials, including stainless steel. The only requirement is that the material must be able to withstand the forces that will be applied to it and it should be weather-resistant, since it will exposed to the environment.

FIGS. 1 and 8 illustrate the boom lock assembly 100 as being installed on an inboard side of boom saddle cradle 180, i.e., on the side of the cradle that is closest to the cab of the carrying vehicle, however, the boom lock could also be installed on the outboard side of the cradle. Additional mounting plates may be required if installing the boom lock assembly in this position, however, the present invention is capable of operating regardless of which side of the saddle cradle the boom lock assembly is mounted. Additionally, multiple boom lock assemblies may be utilized on any particular carrying vehicle, dependent upon the number of booms that the vehicle transports. In the situation where multiple boom lock assemblies were utilized on a single vehicle, all of the assemblies could utilize the vehicle's pressurized air system, or other power system, to operate the actuating means.

The disclosed embodiments are illustrative of the various ways in which the present invention may be practiced. Other embodiments can be implemented by those skilled in the art without departing from the spirit and scope of the present invention.

What is claimed is:

1. A boom lock assembly comprising:
    a lock mounting frame, said lock mounting frame mounted to a boom saddle frame;
    a boom lock, said boom lock slidably mounted on said lock mounting flame and moveable between a first position and a second position wherein when said boom lock is in said first position a locking portion of said boom lock extends over a boom saddle cradle and wherein when said boom lock is in said second position said locking portion is retracted from extending over the boom saddle cradle; and
    a boom lock actuating means, said boom lock actuating means mounted to said lock mounting frame at a first end and to said boom lock at a second end.

2. The boom lock assembly of claim 1 wherein said boom lock actuating means is a pneumatically operated cylinder.

3. The boom lock assembly of claim 1 wherein said boom lock actuating means is a hydraulically operated cylinder.

4. The boom lock assembly of claim 1 wherein said boom lock actuating means is an electrically operated cylinder.

5. The boom lock assembly of claim 1 wherein said lock mounting frame includes a lock support member with a lock guide pin extending therefrom and wherein said boom lock includes a lock guide, wherein said lock guide pin is received within said lock guide.

6. The boom lock assembly of claim 5 wherein said lock support member includes a second lock guide pin and said boom lock includes a second lock guide and wherein said second lock guide pin is received within said second lock guide.

7. A boom lock assembly mountable to a boom saddle frame for locking a spray boom in a boom saddle cradle when transporting the spray boom in a folded configuration, comprising:
    a lock mounting frame, said lock mounting frame including a base member, an actuator sort member and a lock support member, said actuator support member located at a first end of said base member and extending perpendicular to said base member and said lock support member located at a second end of said base member and extending perpendicular to said base member, said lock support member including first and second lock guide pins, said lock guide pins extending perpendicular from said lock support member toward said first end of said base member and parallel to said base member;
    a boom lock, said boom lock including a base plate, first and second side plates, and a locking plate, said locking plate extending perpendicular from a top end of said base plate in a first direction and including a locking portion, said locking portion extending beyond a distal end of said side plates, said base plate including first and second lock guides, said lock guides extending perpendicular to said base plate in a second direction, wherein said second direction is opposite to said first direction, wherein said first and second lock guide pins are received within said first and second lock guides, respectively; and
    a boom lock actuating means, said boom lock actuating means mounted to said actuator support member at a first end and to said boom lock at a second end.

8. The boom lock assembly of claim 7 wherein said boom lock actuating means is a pneumatically operated cylinder.

9. The boom lock assembly of claim 7 wherein said boom lock actuating means is a hydraulically operated cylinder.

10. The boom lock assembly of claim 7 wherein said boom lock actuating means is an electrically operated cylinder.

11. The boom lock assembly of claim 7 wherein said locking portion is approximately 1 inch in length.

12. The boom lock assembly of claim 7 wherein said boom lock is slidably mounted on said lock mounting frame for movement between a first position wherein said locking portion of said boom lock extends over the boom saddle cradle and a second position wherein said locking portion is not disposed over the boom saddle cradle.

13. A method for locking a folded spray boom in a boom saddle cradle comprising the steps of:
    positioning a folded spray boom in a boom saddle cradle;
    remotely actuating a boom lock; and moving a locking portion of said boom lock over the boom saddle cradle wherein the folded spray boom is positioned between said locking portion and said boom saddle cradle.

14. The method of claim 13 wherein said step of remotely actuating a boom lock comprises the step of controlling pressurized air supplied to said boom lock.

15. The method of claim 13 wherein said step of remotely actuating a boom lock comprises the step of controlling hydraulic fluid supplied to said boom lock.

16. The method of claim 13 wherein said step of remotely actuating a boom lock comprises the step of electrically controlling said boom lock.

17. The method of claim 13 wherein said step of moving said locking portion of said boom lock over the boom saddle cradle comprises the step of sliding said boom lock along a longitudinal axis.

18. The method of claim 17 wherein said step of sliding said boom lock along a longitudinal axis comprises the step of sliding said boom lock on first and second boom lock guide pins.

19. A boom lock assembly comprising:
a lock mounting frame;
a boom lock, said boom lock slidably mounted on said lock mounting frame and moveable between a first position and a second position; and
a boom lock actuator, said boom lock actuator mounted to said lock mounting frame at a first end and to said boom lock at a second end.

20. The boom lock assembly of claim 19 wherein when said boom lock is in said first position a locking portion of said boom lock extends over a boom saddle cradle and wherein when said boom lock is in said second position said locking portion is retracted from extending over a boom positioned in the boom saddle cradle.

21. The boom lock assembly of claim 19 wherein said boom lock actuator is a pneumatically operated cylinder.

22. The boom lock assembly of claim 19 wherein said boom lock actuator is a hydraulically operated cylinder.

23. The boom lock assembly of claim 19 wherein said boom lock actuator is an electrically operated cylinder.

24. The boom lock assembly of claim 19 wherein said lock mounting frame includes a lock support member with a lock guide pin extending therefrom and wherein said boom lock includes a lock guide, wherein said lock guide pin is received within said lock guide.

25. The boom lock assembly of claim 24 wherein said lock support member includes a second lock guide pin and said boom lock includes a second lock guide and wherein said second lock guide pin is received within said second lock guide.

26. A boom lock assembly mountable to a boom saddle frame for locking a spray boom in a boom saddle cradle when transporting the spray boom in a folded configuration, comprising:
a lock mounting frame, said lock mounting frame including a base member, an actuator support member and a lock support member, said actuator support member located at a first end of said base member and extending perpendicular to said base member and said lock support member located at a second end of said base member and extending perpendicular to said base member, said lock support member including first and second lock guide pins, said lock guide pins extending perpendicular from said lock support member toward said first end of said base member and parallel to said base member;
a boom lock, said boom lock including a base plate, first and second side plates, and a locking plate, said locking plate extending perpendicular from a top end of said base plate in a first direction and including a locking portion, said locking portion extending beyond a distal end of said side plates, said base plate including first and second lock guides, said lock guides extending perpendicular to said base plate in a second direction, wherein said second direction is opposite to said first direction, wherein said first and second lock guide pins are received within said first and second lock guides, respectively; and
a boom lock actuator, said boom lock actuator mounted to said actuator support member at a first end and to said boom lock at a second end.

27. The boom lock assembly of claim 26 wherein said boom lock actuator is a pneumatically operated cylinder.

28. The boom lock assembly of claim 26 wherein said boom lock actuator is a hydraulically operated cylinder.

29. The boom lock assembly of claim 26 wherein said boom lock actuator is an electrically operated cylinder.

30. The boom lock assembly of claim 26 wherein said locking portion is approximately 1 inch in length.

31. The boom lock assembly of claim 26 wherein said boom lock is slidably mounted on said lock mounting frame for movement between a first position wherein said locking portion of said boom lock extends over the boom saddle cradle and a second position wherein said locking portion is not disposed over a boom positioned in the boom saddle cradle.

32. A method for locking a spray boom in a boom saddle cradle comprising the steps of:
positioning a spray boom in a boom saddle cradle; and
actuating a boom lock;
wherein said step of actuating a boom lock moves a locking portion of said boom lock over the boom saddle cradle.

33. The method of claim 32 wherein said step of actuating said boom lock comprises the step of supplying pressurized air to a cylinder.

34. The method of claim 32 wherein said step of actuating said boom lock comprises the step of supplying hydraulic fluid to a cylinder.

35. The method of claim 32 wherein said step of actuating said boom lock comprises the step of electrically controlling a cylinder.

36. The method of claim 32 wherein said locking portion of said boom lock is moved over the boom saddle cradle by sliding said boom lock along a longitudinal axis.

37. The method of claim 36 wherein said step of sliding said boom lock along a longitudinal axis comprises the step of sliding said boom lock on first and second boom lock guide pins.

* * * * *